United States Patent [19]

Nishiki

[11] Patent Number: 4,991,192

[45] Date of Patent: Feb. 5, 1991

[54] X-RAY IMAGING APPARATUS

[75] Inventor: Masayuki Nishiki, Ootawara, Japan

[73] Assignee: Kabushiki Kaisha Toshiba, Kawasaki, Japan

[21] Appl. No.: 357,753

[22] Filed: May 26, 1989

[30] Foreign Application Priority Data

Jun. 2, 1988 [JP] Japan .................. 63-136353

[51] Int. Cl.⁵ .................. H05G 1/64; H05G 1/22; H04N 5/32

[52] U.S. Cl. .................. 378/99; 378/106; 358/111

[58] Field of Search .................. 378/99, 106; 358/111

[56] References Cited

U.S. PATENT DOCUMENTS

| Re. 32,164 | 5/1986 | Kruger | 378/99 |
|---|---|---|---|
| 4,185,198 | 1/1980 | Fujimoto | 358/111 |
| 4,442,539 | 4/1984 | Aichinger et al. | 378/99 |
| 4,555,728 | 11/1985 | Fenster et al. | 358/111 |
| 4,612,572 | 9/1986 | Komatsu et al. | 358/111 |
| 4,628,355 | 12/1986 | Ogura et al. | 358/111 |

Primary Examiner—Janice A. Howell
Assistant Examiner—Don Wong
Attorney, Agent, or Firm—Finnegan, Henderson, Farabow, Garrett, and Dunner

[57] ABSTRACT

An X-ray imaging apparatus comprises an X-ray generator, an image intensifier for converting an X-ray image of a subject under examination to an optical image, a solid state image sensor for picking up the optical image of the image intensifier, a driver circuit for driving the solid state image sensor and a television monitor for visually displaying an image signal obtained from the solid state image sensor as an X-ray optical image. The X-ray generator is controlled such that an X-ray pulse is not emitted during an interval in which the solid state image sensor transfers charges from charge storage sections to charge transfer sections.

5 Claims, 2 Drawing Sheets

VERTICAL SYNC SIGNAL VD

FIELD SHIFT PULSE FP

ONE-SHOT PULSE OP

DRIVE PULSE DP

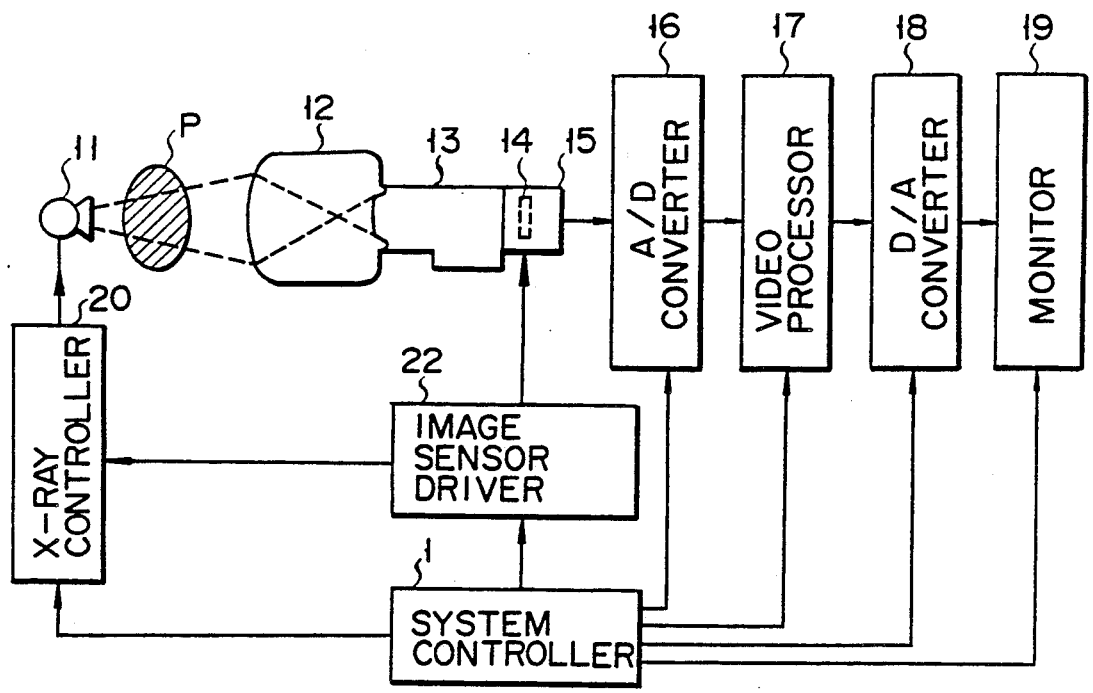
F I G. 1
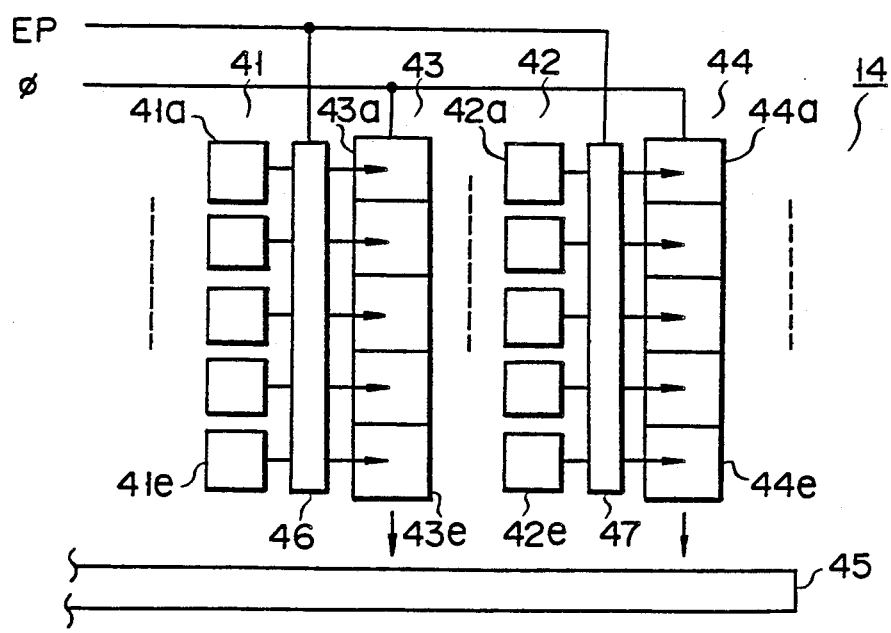
F I G. 2

X-RAY IMAGING APPARATUS

BACKGROUND OF THE INVENTION

1. Field of the Invention

The present invention relates to an X-ray imaging apparatus which displays X-ray images as TV images.

2. Description of the Related Art

An X-ray imaging apparatus comprises an X-ray tube for directing X rays onto a subject under examination, an image intensifier adapted to convert an X-ray image formed of X rays transmitted through the subject to an optical image, a television camera for picking up the optical image produced on the image intensifier and a television monitor for visually displaying a picture signal from the TV camera.

A conventional X-ray imaging apparatus utilizes a television camera using a pickup tube such as a vidicon or saticon. With such a TV camera, various noise components of the signal are large relative to the desired signal, thus reducing dynamic range. A dynamic range of 60–70 dB cannot be provided. As a result, the picture quality is deteriorated. Furthermore, the residual image effect is noticeable, and the resolution is reduced because of the broadening of the beams.

SUMMARY OF THE INVENTION

It is accordingly an object of the present invention to provide an X-ray imaging apparatus which increases the dynamic range and eliminates residual images.

According to the present invention, there is provided an X-ray imaging apparatus comprising an X-ray tube for directing X rays onto a subject under examination; an image intensifier for converting an X-ray image of the subject to an optical image; a solid state image sensor for picking up the optical image produced by the image intensifier; a driver circuit for driving the solid state image sensor; and a television monitor for visually displaying a picture signal obtained from the solid state image sensor as an X-ray image, the X-ray tube being controlled not to emit X rays during an interval in which the solid state image sensor transfers stored charges from a charge storage section to a charge transfer section.

In the present invention, the emission of X rays is prohibited when the driver circuit provides a field shift pulse to charge transfer gate circuits in the solid state image sensor.

BRIEF DESCRIPTION OF THE DRAWINGS

FIG. 1 is a block diagram of an X-ray imaging apparatus embodying the present invention;

FIG. 2 illustrates a solid state image sensor;

DETAILED DESCRIPTION OF THE PREFERRED EMBODIMENTS

Figure 3:
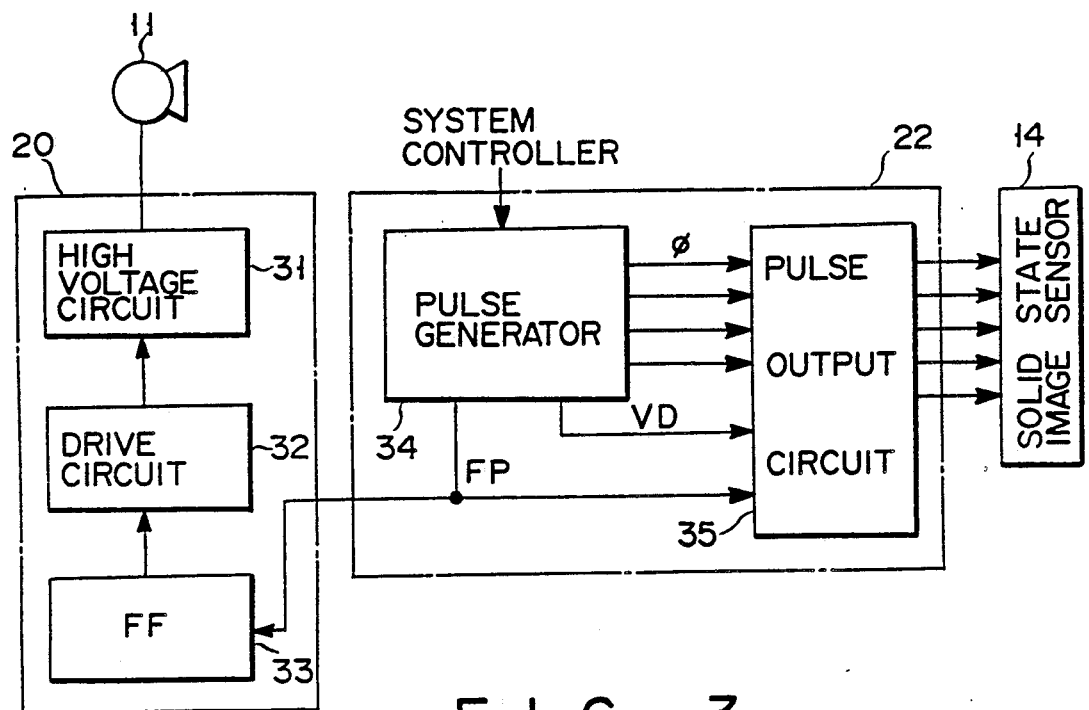
FIG. 3 shows block diagrams of an X-ray controller and a CCD driver.

Referring now to FIG. 1, an X-ray tube 11 for emitting X rays and an image intensifier 12 for converting an X-ray image to an optical image oppose each other with a subject P under examination disposed therebetween. The output surface of image intensifier 12 and a TV camera 15 are disposed with an optical system 13 therebetween. TV camera 15 contains a solid state image sensor 14. As shown in FIG. 2, solid state image sensor 14 comprises charge storage sections 41 and 42 comprising of charge storage elements (e.g., photodiodes) 41a–41e, and 42a–42e respectively vertical charge transfer sections (CCDs) 43 and 44 formed adjacent to charge storage sections 41 and 42, respective. The solid state image sensor 14 further comprises a horizontal charge transfer section (CCD) 45 for transferring charges from the vertical transfer sections horizontally and gate sections 46 and 47 between the charge storage sections and the horizontal transfer section.

Although the gate sections 46 and 47 may be used to control charge transfer, the voltage applied to the vertical charge transfer sections 43 and 44 may alternatively be controlled to facilitate charge transfer from the charge transfer section 41 (42) to the charge transfer section 43 (44). This alternative method for controlling the voltage provides an advantage wherein the electrodes of the solid state image sensor can be reduced in number.

TV camera 15 has its output coupled to a video processor 17 via an A/D converter 16. Video processor 17 performs signal processing, such as filtering, on an image signal output from solid state image sensor 14 which has been converted to a digital signal by A/D converter. Video processor 17 has its output coupled to a TV monitor 19 via a D/A converter 18.

X-ray tube 11 is connected to an X-ray controller 20, which in turn is connected to a system controller 1, and a CCD driver 22. The X-ray controller 20 responds to a system control signal and a field shift pulse to apply a high voltage to X-ray tube 11. System controller 1 provides timing control signals to image sensor driver 22, A/D converter 16, video processor 17, D/A converter 18 and monitor 19 as well as X-ray controller 20 so as to control these circuits totally. System controller 1 may be comprised of a CPU.

As shown in FIG. 3, image sensor driver 22 comprises a pulse generator 34 for providing vertical and horizontal transfer pulses $\phi$, vertical sync pulses VD and field shift pulses FP. Image sensor driver 22 further comprises a pulse output circuit 35. Image sensor driver 22 responds to a control signal from system controller 21 input to the pulse generator 34. The pulse output circuit 35 provides pulses to solid state image sensor 14. The field shift pulse FP is also applied to X-ray controller 20.

X-ray controller 20 is connected to X-ray tube 11 for directing X rays to the subject and comprises a high voltage circuit 31 for providing a high voltage to X-ray tube 11, a drive circuit 32 for providing drive pulses to the high voltage circuit 31 and a flip-flop 33 for controlling drive circuit 32. X-ray controller 20 input to the pulse generator 34. The pulse output circuit 35 provides from the charge storage section to the charge transfer section of the solid state image sensor 14.

Figure 4:
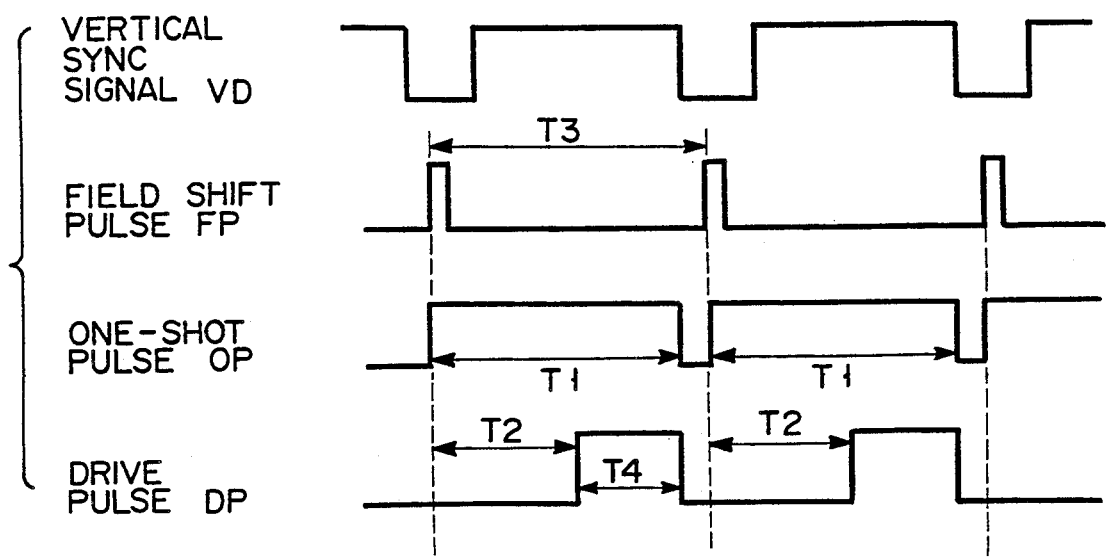
FIG. 4 is a timing diagram which is useful for explaining the driving operation of the solid state image sensor.

In operation, system controller 21 applies control signals to the various circuits. In image sensor driver 22, pulse generator 34 responds to a system control signal and outputs the transfer pulses $\phi$, the vertical sync signal VD and the field shift pulse FP, which are all shown in FIG. 4. The field shift pulse FP is produced during a vertical blanking interval of the vertical sync signal VD. The field shift pulse is produced a pulse interval T3. Those pulses are amplified and shaped in pulse output circuit 35 and then applied to solid state image sensor 14.

Upon receipt of the field shift pulse FP flip-flop 33 of X-ray controller 20 responds to the rising edge of pulse FP to produce a one-shot pulse OP with a pulse width T1 (<T3) less than one field interval (or one frame interval), which is applied to drive circuit 32. Drive circuit 32 provides the drive pulse DP to high voltage circuit 31 after a delay of T2 from the rising edge of one-shot pulse OP having a pulse width T4. High voltage circuit 31 responds to the drive pulse DP to provide a high voltage to X-ray tube 11 which is thus energized. X-ray tube 11 directs X rays to subject P. X rays transmitted through the subject enter image intensifier 12 to product an X-ray optical image. The optical image is projected onto the pickup surface of solid state image sensor 14 via optical system 13. At this point charges corresponding to the optical image are stored in charge storage sections 41 and 42.

When time T1 (=T2+T4) lapses in the above operation, drive circuit 32 causes drive pulse DP to go low in response to the falling edge of one-shot pulse OP. At this point, high voltage circuit 31 stops production of the high voltage, so that X-ray radiation from X-ray tube 11 is terminated. Thereafter, pulse generator 34 produces the next field pulse FP which is applied to gates 46 and 47 of solid state image sensor 14 to open the gates. The charges are then transferred from charge storage sections 41 and 42 to vertical charge transfer sections 43 and, 44 via gates 46 and 47.

The charges in vertical charge transfer sections 43 and 44 are vertically transferred at high speed by shift pulse φ and then fed to A/D converter 16 through horizontal charge transfer section 45 as an image signal. A/D converter 16 converts the image signal to a digital signal which is, in turn, output to video processor 17. Video processor 17 performs signal processing, such as filtering, on the digital image signal and provides the resultant signal to D/A converter 18 for conversion to an analog image signal. The analog image signal is applied to monitor 19 as a TV signal and visually displayed as an X-ray optical image.

When the subsequent field shift pulse is generated, flip-flop 33 responds to the rising edge of the field shift pulse to provide a one-shot pulse of pulse width T1 to driver circuit 32 again. Driver circuit 32 then provides a drive pulse DP to high voltage circuit 31 after a delay of T2 as in the previous operation. High voltage circuit 31 applies a high voltage to X-ray tube 11 to energize it. X-ray tube 11 directs X rays onto subject P again. As a result, an X-ray image corresponding to a second video is picked up and then displayed.

According to the present invention, as described above, the generation of X rays is stopped during an interval in which the charges stored in the charge storage section of the solid state image sensor are being shifted to the charge transfer section by the field shift pulse produced in a vertical blanking interval. Hence, undesired charges will not be mixed with the charges which are being transferred. Successive images can, therefore, be obtained which have good time resolution. The optical image is picked up by a solid state image sensor. Thus, large quantities of charges can be stored and the dynamic of the system can be increased.

In the above embodiment, the generation of X rays may alternatively be controlled by a vertical blanking pulse, rather than the field shift pulse. Furthermore, because the quantity of X rays required may vary depending on a subject under examination, the delay time T2 of the drive pulse may be set to an arbitrary value to adjust the quantity of X rays emitted. Corresponding adjustment of times T1 and T2 will allow a desired quantity of X rays to be generated at a desired point of time within the video field.

What is claimed is:

1. An X-ray imaging apparatus comprising:
   X-ray generating means for irradiating a subject under examination with X rays;
   image intensifier means for converting X rays transmitted through the subject to an optical image;
   solid state image sensor means for detecting the optical image produced by said image intensifier means, said solid state image sensor means including charge storage sections for storing charges corresponding to the optical image and charge transfer sections for transferring the charges stored in said charge storage sections;
   driver means for driving said solid state image sensor means;
   X-ray control means for controlling said X-ray generating means to prevent an X-ray pulse from being emitted during the transfer of charges from said charge storage sections to said charge transfer sections of said solid state image sensor means; and
   a television monitor for visually displaying an image signal from said solid state image sensor means as an X-ray optical image.

2. An X-ray imaging apparatus according to claim 1, wherein said driver means provides vertical sync signals including a vertical blanking pulse and a field shift pulse for shifting the stored charges in said charge storage sections to said charge transfer sections of said solid state image sensor means; and said X-ray control means receives the field shift pulse.

3. An X-ray imaging apparatus according to claim 1, wherein said driver means produces a vertical blanking pulse, and said X-ray control means is responsive to the vertical blanking pulse.

4. An X-ray imaging apparatus according to claim 1, wherein said X-ray control means includes means for selecting a point in time when the X rays are generated and for selecting the length of time the X rays are generated.

5. An X-ray imaging apparatus comprising:
   X-ray generating means for irradiating a subject under examination with X rays;
   image intensifier means for converting X rays transmitted through the subject to an optical image;
   solid state image sensor means for detecting the optical image produced by said image intensifier means, said solid state image sensor means including charge storage sections for storing charges corresponding to the optical image and charge transfer sections for transferring the charges stored in said charge storage sections;
   driver means for providing a field shift pulse to said solid state image sensor means to transfer the charges from said charge storage sections to said charge transfer sections of said solid state image sensor means;
   X-ray control means responsive to the field shift pulse for controlling said X-ray generating means to prevent an X-ray pulse from being emitted during the transfer of charges from said charge storage sections to said charge transfer sections of said solid state image sensor means; and
   a television monitor for visually displaying an image signal from said solid state image sensor means as an X-ray optical image.

* * * * *